Dec. 12, 1961 A. H. ROSENTHAL 3,012,467
SPECTRUM ANALYZER
Filed June 25, 1957 2 Sheets-Sheet 1

INVENTOR
ADOLPH H. ROSENTHAL
BY
ATTORNEYS

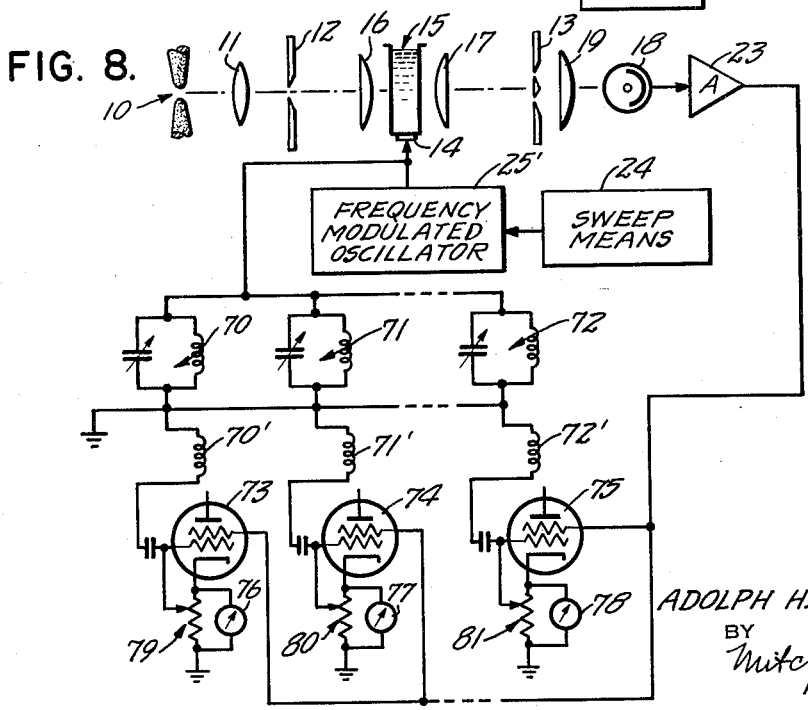

United States Patent Office 3,012,467
Patented Dec. 12, 1961

3,012,467
SPECTRUM ANALYZER
Adolph H. Rosenthal, Forest Hills, N.Y., assignor, by mesne assignments, to Servo Corporation of America, Hicksville, N.Y., a corporation of New York
Filed June 25, 1957, Ser. No. 667,833
11 Claims. (Cl. 88—14)

This invention relates to recording and indicating spectrometers for spectral analysis, and this particular application incorporates improvements and modifications over the disclosure of my copending application, Serial No. 525,432, filed August 1, 1955, of which this application is a continuation-in-part.

It is an object of the invention to provide an improved device of the character indicated.

It is another object to provide an improved spectrometer which, in addition to being accurate and reliable, will permit as fast as possible a comparative analysis of an unknown spectrum against a known spectrum.

It is also an object to provide an improved spectrometer inherently free from "ghosts," as are present in spectrometers employing ruled diffraction gratings.

It is a specific object to meet the above objects with a completely automatic device.

It is a further specific object to meet the above objects with a device which will indicate the particular spectral line or range at which a given specimen departs from a predicted spectrum, representing a norm for evaluation purposes.

It is another specific object to provide special-purpose spectrometers for directly and quantitatively indicating departures in intensity distribution of one or more specific "lines" in a spectrum to be analyzed, the departures being for a given unknown specimen in reference to a known or predicted spectral relationship, so that there may be a direct indication of the relative purity or other quality of the unknown specimen being analyzed.

Still another object is to produce an improved scanning monochromator with automatic means for evaluating an unknown against a predicted or known spectrum.

It is a general object to meet the above objects with a device requiring a relatively few or no mechanically moving parts.

Other objects and various further features of novelty and invention will become apparent or will occur to those skilled in the art from a reading of the following specification, in conjunction with the accompanying drawings. In said drawings, which show, for illustrative purposes only, preferred forms of the invention;

FIGS. 4 and 5 are simplified fragmentary views illustrating modifications of FIG. 3;

FIGS. 6 and 7 are simplified electrical and optical diagrams of alternative apparatus for developing characterized means of the invention; and FIG. 8 illustrates a modification of the apparatus of FIG. 1.

Figure 1:
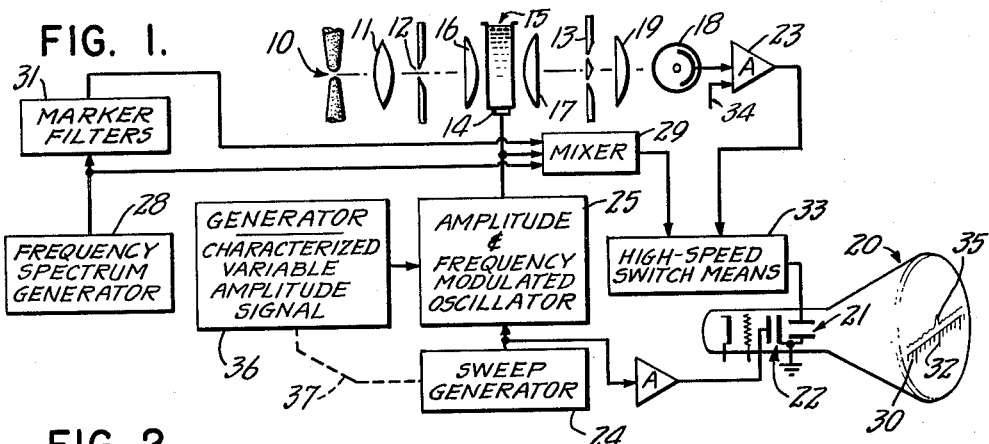
FIG. 1 is an optical and electrical diagram schematically showing component parts of a spectrometer incorporating features of the invention.

Briefly stated, this invention contemplates the application of ultrasonic-cell light-modulating techniques for spectral analysis. Such techniques have been described in specific application to color modulation, utilizing an ultrasonic cell, so that they need not be described in detail in the present case. It suffices to say that the spectrum to be analyzed may be provided by a source of light (or by a transparent absorption cell in the path of light from a constant source), said light being directed onto an ultrasonic light-modulating cell, combined with diaphragm means effective upon excitation of said cell to control the passage of a predetermined color component of the spectrum formed by said cell. An electric oscillator excites the cell and, depending upon the frequency of excitation, various wavelength regions or colors within the spectrum are passed by the diaphragm.

In the said copending application, use is made of such modulation of an ultrasonic cell to produce what may be called an ultrasonic wave grating, whereby an ultrasonic monochromator is obtained. More specifically, the invention there was concerned with means for observing the intensity of light passed by a light-modulating ultrasonic-cell system and for displaying the observed intensity or amplitude as a function of the oscillator frequency and, therefore, as a function of the color component to which a particular frequency corresponds. This display device was capable of displaying an entire spectrum, and the frequency of the source was periodically so modulated as to scan this entire spectrum. The output of the light-responsive device caused an amplitude modulation or other indication of amplitude in the display.

In the present invention, specially characterized means are employed in which the characterization is unique to a particular spectrum; the characterization varies and is coordinated with cell-excitation frequency and is so applied to a part of the spectrometer as to effectively vary the amplitude of electrical signals that would otherwise be developed by the means responsive to light passed by the optics. In this way, if the characterized means is inherently characterized so as to duplicate the spectrum expected upon analysis of a given unknown sample, then by coordinating the operation of the characterized means with the cell-excitation frequency, that is, with the instantaneous scan position of the cell within the spectrum being analyzed, it is possible to note departures in the unknown with reference to the known spectrum. In accordance with the invention, these departures can be uniquely identified both as to extent of departure and as to the frequency or spectrum line at which departure occurred, thereby facilitating rapid analysis, as in production-testing of numerous and various specimens.

Two general forms of the invention will be described. In one form, the entire spectrum is displayed along a sweep axis of a cathode-ray tube and, if desired, marker lines are applied against this display so as to facilitate an interpretation of spectral "lines" at which the abnormality or departure is observed. In the other general form, narrow-band tuned filters are preset to respond to particular discrete frequencies or "lines" of interest within the spectrum to be scanned, each of these frequencies representing a spectral "line" of interest in the spectrum. Each filter is associated with its own amplifying and indicating means, and by characterizing the bias or gain setting for each amplifier in accordance with the inverse of the expected spectral characteristics at such "lines," then indications produced by each amplifier output are direct reflections of departure of the unknown specimen with reference to the known or pre-characterized spectrometer response.

Throughout the specification and claims, reference is made to "light," and this term will be understood to apply to all radiant energy capable of being accommodated by the described parts. "Light" as used herein will thus be understood to include visible and/or invisible light, as in the infrared region.

Referring to FIG. 1 of the drawings, the invention is shown in application to a spectrometer creating a visual spectral display in the form of a curve on which relative-intensity values for spectral "lines" (as a function of optical wavelength) indicate departures in spectral transmission (or other characteristics) of the unknown as compared with the known (or precharacterized) relationship. The material to be analyzed may be inserted in or be a part of an energy source, which may include an arc light or a flame, commonly used in spectroscopy. In certain cases, the source 10 may be a special demountable discharge tube, such as a hollow cathode or other light source. The source 10 will also be understood, in certain cases, as represented directly by a furnace opening, as, for example, in metallurgical applications.

The source 10 is imaged by means 11 on the entrance slit of a diaphragm 12 of an ultrasonic-cell system as described in detail in copending patent application, Serial No. 217,104, filed March 23, 1951, now Patent No. 2,807,799. As explained in said application, a certain wavelength region or spectral "line" will issue from the apertures of a second diaphragm 13 for a particular oscillating frequency exciting the crystal 14 of the ultrasonic light-modulating cell 15. The cell 15 is in a collimated region between collimating lenses 16–17, serving to image the slit of diaphragm 12 onto the plane of diaphragm 13. The radiation issuing from diaphragm 13 is focused by means 19 on a radiation-sensitive transducer 18 which may be a photocell or a photo-multiplier or an infrared-sensitive device, such as a bolometer, (e.g. thermistor) thermocouple, photo-conductive cell, a Golay cell, or the like, depending upon the radiation region to be investigated.

As indicated generally above, the visual-display device 20 creates a display representing amplitude of response at 18 as a function of spectral wavelength (which, in turn, is inversely proportional to frequency of excitation of the cell 15). In the form shown, the display device 20 is a cathode-ray tube having mutually perpendicular deflection systems 21–22 and excited by means (not shown) to produce a spot of constant intensity on the display face. Output of photocell 18 is amplified at 23 and applied directly to the vertical-deflection system 21, and output of the sweep generator 24 is applied to the other deflection system 22. The sweep generator 24 is connected in controlling relation with the oscillator 25, so that positions along the sweep base may correspond to the instantaneous frequency of excitation of the cell 15. With the parts thus far described, the spectrum development will have the appearance of an undulating curve stretching across the face of the tube 20 and marked by predominant lower and upper peaks, representing peaks in the spectral response of the material injected at 10.

As explained in said copending application, means are preferably provided for establishing on the display face of tube 20 reference marks identifiable with known frequencies or with known "lines" in the spectrum. For this purpose, a frequency-spectrum generator 28, which may be stabilized by a crystal, may develop a spectrum of harmonic peaks, each having the same stability and accuracy as the fundamental crystal. This spectrum is supplied directly to a mixer 29 for mixing with the output of the frequency-modulated oscillator 25. For each coincidence of a harmonic frequency (within the frequency spectrum of generator 28) with the instantaneous oscillator frequency, mixer 29 will develop an output pulse. Such pulses will be of substantially uniform amplitude and may, when applied to the deflection system 21, produce vertical reference marks (as at 30) on the face of the tube 20. In a separate line, marker filters (designated generally 31) may serve to selected and individually amplify certain of the harmonic frequencies in the output of the generator 28, for separate supply to the mixer 29, thereby causing subdivision markings 32 of greater amplitude, say, for every fifth frequency-identifying mark across the spectrum.

While signals for mixer 29 and amplifier 23 may be applied simultaneously to deflection system 21, it is preferred to avoid ambiguity between marks produced by marking means 28—31 and the curve developed in accordance with the response of photo-electric means 18. For this purpose, a high-speed switch or commutator 33 is provided to separately receive the outputs of the mixer 29 and of the amplifier 23, so that, at any one instant of time, only one mark will be created on the face of the tube 20. The speed of operation of commutator 33 is preferably so high compared with the sweep rate of generator 24 that, in effect, both the response curve and the marker lines appear to be developed simultaneously along the face of the tube 20. In order that the curve and the marks may be displayed in vertically separated relation, mixer 29 and amplifier 23 will be understood to include biasing means, suggested at 34, for assuring the desired difference is base levels of signals supplied by these two sources to display means 20.

With the rise and fall of the saw tooth produced by sweep generator 24 as a function of time, the spectra developed over the left face of diaphragm 13 will scan the apertures in diaphragm 13 so that successively different wavelength regions will pass these apertures and excite the radiation-sensitive transducer 18. Preferably the display tube 20 is a standard phosphor-screen cathode-ray tube having long-persistence characteristics; alternatively, tube 20 may be a so-called dark-trace cathode-ray tube. For long persistence, the displayed spectrum may be directly viewed, or if a permanent record of the spectral curve is desired, it can be photographed from the tube face. Alternatively, the horizontal-deflection voltage can control the rotation of a drum, and the vertical deflection voltage can displace a stylus directly writing on the drum or a light beam photographically writing on the drum. At any event, the term "display means" as generally employed herein will be understood to apply to these and other known display and recording mechanisms.

In accordance with the invention, characterized means are provided for effectively varying the amplitude of electrical signals that would otherwise be developed by the photoelectric means, the characterizations being such as to superimpose on the observed spectrum of the unknown specimen a characteristic representing the inverse of the expected characteristic. If the unknown characteristic happens to match the expected characteristic, then no deviations will be observed by the described apparatus, and no particular amplitude modulations will appear in the display on the face of tube 20. However, if there should be a deviation, say at the spectral "line" or mark 32, such deviation will appear as a "pip" 35, indicating deviation at that part of the spectrum.

FIG. 1 illustrates a particular manner in which the described characterization may be injected into the spectrum analyzer to produce this result. In the arrangement shown, the characterized means is a signal generator 36 connected in amplitude-modulating relation with the oscillator 25, so as to vary the amplitude level at which the cell 15 will be excited. The dashed interconnection 37 between the sweep generator 24 and signal generator 36 suggests coordination of the characterized generator signal with the instantaneous frequency of cell excitation. It will be appreciated that the function of amplitude modulation developed by generator 36 will be to variably attenuate light passing through cell 15 on the axis on the optical system, said varying attenuation being strictly as a function of the swept frequency and therefore of the instantaneous spectrum "line" which is being passed by diaphragm 13 of the color-modulating system. Thus, if these characterized amplitude modulations are the exact inverse of the spectrum in the unknown (at 10), there will be substantially no variation in the output of photocell 18, throughout a scanning of the spectrum. However, if there is a departure at any particular frequency, as at the frequency designated 32 in the display, then the extent of such departure will be apparent, as by a "pip" indication 35. If the "pip" indication is taken as positive upward, as for the case of the "pip" 35 shown, this may be indicative of a particular component deficiency in the unknown. If, on the other hand, such component is excessively present in the unknown, the "pip" will be downwardly directed. In both cases, the magnitude of "pip" 35 indicates the extent of component deviation from the reference (pre-characterized at 36). Thus, the "pip" indication at 35 may provide a poled quantitative indication of the departure of the unknown from the characterized reference spectrum.

Figure 2:
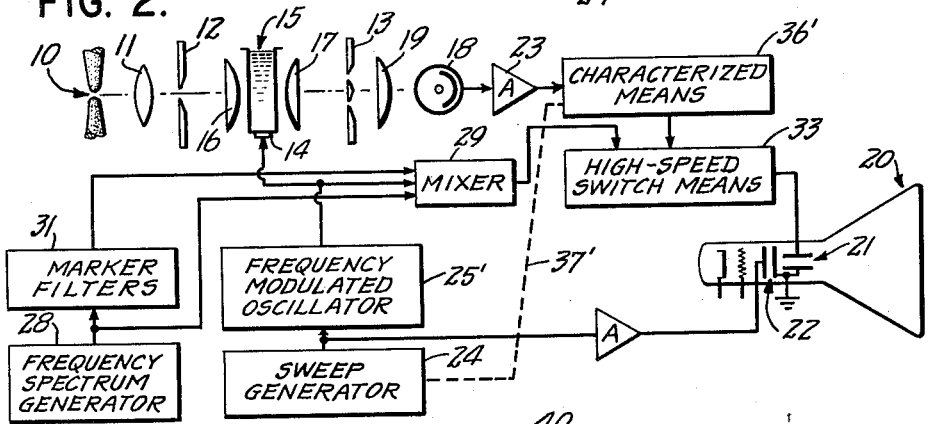
FIG. 2 is a similar diagram of another form of the invention.

In the arrangement of FIG. 2, much of the optics is as described for FIG. 1 and, therefore, corresponding parts of the optics and of the display have been given the same reference numerals. The essential difference between FIGS. 1 and 2 is that in FIG. 2 the characterized means 36', which may again be a signal generator or which may be merely a suitably characterized variable resistance, is applied in variable biasing relation with the deflection system 21 on which the output of photocell 18 is observed. 37' again suggests coordination of the characterized means 36' with operation of the sweep generator and, therefore, with frequency-swept excitation of cell 15. The net effect of characterization at 36' is to vary the amplitude of the electrical signals that would otherwise be developed by the photocell 18; again, if the characterization reflects the inverse of the expected spectral development, then amplitude displays at 20 will directly reflect departures between the unknown and the known spectral analyses.

Figure 3:
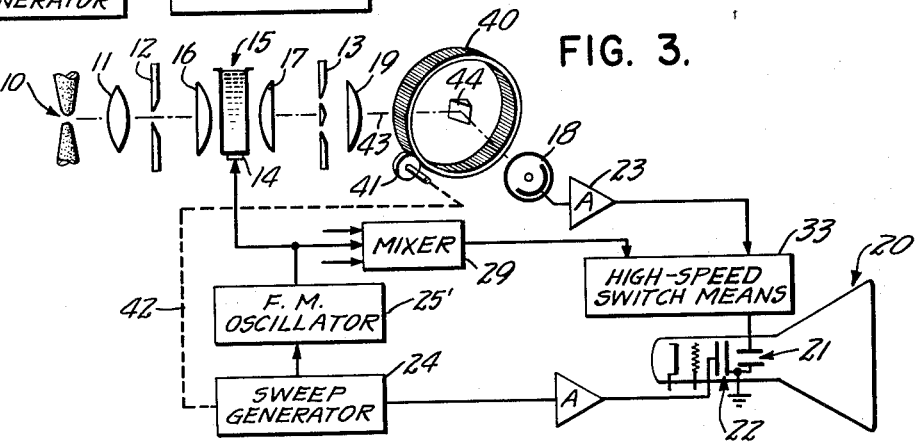
FIG. 3 is a diagram representing a further embodiment of the invention.

In the arrangement of FIG. 3, I employ a mechanically displaceable light attenuator as the characterizing means, the characterized record being developed on a transparent band which may be the rim 40 of a rotatable drum; the drum may be continuously driven, as by an edge-drive wheel 41 synchronized (as suggested at 42) with periodic cycling of the sweep generator 24. Light passed by the light modulator on the axis 43 is transmitted through (and attenuated by) a small segment of the transparent band 40 and is reflected by mirror means 44 to photocell 18 for amplification at 23 and display, as described for FIGS. 1 and 2. The varying density suggested by shading on the band 40 may be developed by means to be described in connection with FIG. 6, but again it will be appreciated that, with rotation or mechanical movement of the band 40 (through the optical axis 43) suitably coordinated with the instantaneous swept frequency of oscillator 25', the net effect is to vary the amplitude of electrical signals that would otherwise be developed by the cell 18 in response to the unknown spectrum originating at 10. Departures from the reference 40 will thus be displayed, as described at 35 for FIG. 1.

Figure 4:
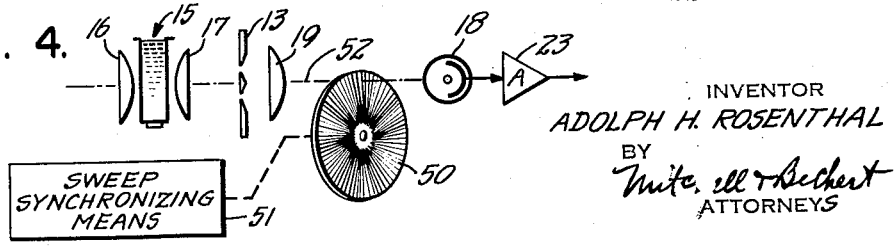

In the arrangement of FIG. 4, essentially the same method of characterizing the display is used, except that the variable light attenuator is a disc 50 driven by sweep synchronizing means 51. In other words, angular position of the disc 50 is strictly coordinated with the instantaneous frequency of excitation of the cell 15, as in the case of FIG. 3. Variable densities which account for variable attenuations of light on the axis 52 may be developed in an annular band about the axis of the disc 50, as will be understood. Again, departures from the reference 50 may be displayed, as described at 35 for FIG. 1.

In the arrangement of FIG. 5, the action is essentially the same as described for FIGS. 3 and 4, except that the variable light attenuator is a reciprocable strip 55 oriented generally transverse to the optical axis 56 and reciprocated by means 57, strictly synchronized both with the sweep in the display and with the instantaneous frequency of excitation of cell 15.

The arrangements of FIGS. 6 and 7 represent alternative methods whereby permanently recorded reference spectra may be developed for use in one of the characterized means 36—36'—40, etc., described in one or more of the above embodiments. In the arrangement of FIG. 6, the ultrasonic light modulator is as previously described, and the reference material whose spectral characteristics are to be permanently recorded, is assumed to be that originating at 10. In this case, upon driving the sweep generator (as by means 60) through a cycle of controlled frequency variations at 25', the diffracted spectra passed by the cell 15 will be variably shifted, so that light passing along the optical axis (beyond lens 19) will be strictly a reflection of the reference spectral characteristics originating at 10. A permanent record may be developed by laying a photographic film on the periphery of a drum 61, geared directly to the drive means 60, in such ratio that, for example, a full rotation of the drum 61 may represent a full sweep of the spectrum observed with the monochromator. Alternatively, if the drive means 60 is otherwise geared to the drum 61 (e.g. more than one revolution of drum 61 for one sweep by generator 24), and if drum 60 is axially shifted as a function of its rotation, a slightly spiraled or helically developed record may be traced on the photographic film carried by drum 61; the recorded spectrum will thus appear over more than one full revolution of the drum 61. In either case, a permanent record may be developed and later used as for example at 40 in the variable-attenuation form of FIG. 3. Alternatively, any other spectrograph may be used for producing the "comparison spectrum," or it may also in simple cases be drawn by hand.

In the arrangement of FIG. 7, the variations in light transmission through the monochromator, due to spectral characteristics at the source 10, are permanently recorded on a memory device, such as a magnetic tape 65 carried by the periphery of a drum 66. The electrical signal used for recording on the tape 65 may be developed by photocell 18, amplified at 23, and applied by a recording head suggestively indicated at 67. Drive coordination for rotation of the drum 66 as a function of instantaneous cell-excitation frequency is all as described in connection with FIG. 6. If desired, provision may be made for selective erasure of a recorded image at 65 by utilizing a recording head 68 and selectively operable means 69 for applying the erasing bias. The signal generators 36—36' of FIGS. 1 and 2 may be tape-playback devices, functioning from prerecorded tape 65, as will be understood.

As indicated generally above, the invention is also applicable to a spectrometer for indicating the percentage content of certain materials in a particular mixture. Such a device is shown in FIG. 8. It is known that relative amounts of materials in a mixture can be determined by the intensity of certain chosen spectrum "lines" characteristic of particular materials. In quantitatives spectral analysis, these "lines" are known as "rayes ultimes." In measuring only the relative intensity of such "lines," the amount of component materials can be determined with great accuracy. In many industrial spectral analytical problems, the type of material is known, but it is important to know the amount. Thus, in steel analysis, one knows which materials are present, such as carbon, cobalt, manganese, chromium, etc., but one has to know exactly the percentage of each of these components to determine the metallurgical properties of the steel. The device of the present invention can establish this percentage quickly during the melting process, because the molten mixture can adequately provide the energy source 10 for analysis.

Some industrial spectrometers working with standard diffraction gratings have preset slits at the position of known spectral 'lines," and behind each slit is a photocell and associated circuitry, the output of which is indicated by a meter calibrated in percentage by weight. While this procedure can also be employed with the present ultrasonic monochromator, which is, in effect, an ultrasonic wave grating, the fast spectral scanning (inherent in frequency-modulation of the gratings) permits the simple solution represented by FIG. 8.

In FIG. 8, the optical elements of the system correspond to those described in FIG. 1, and are therefore given the same reference numerals. The frequency-modulated oscillator 25' may be governed by a manual control of frequency or automatically by the sweep means 24, and in addition to exciting the cell 15, the oscillator output is applied to a plurality of separate display control circuits. The function of each such control circuit is to cause or permit a particular amplitude display essentially only for a single preselected "line" or narrow band in the optical spectrum. This function can be achieved by switching means activating the amplitude display under control of means synchronized with or specifically referenced to sweep means 24; however, in the form shown, these control circuits employ tuned filters, such as tank circuits 70—71—72, each tuned to a different relatively narrow frequency band within the frequency-modulated spectrum, and therefore representing substantially a discrete color component or "line" in the color spectrum. Whenever the changing frequency coincides with one of the frequencies of these tuned circuits, voltage is induced in a coil, such as the coil 70' coupled to the inductance of the tank circuit 70, and this voltage is impressed on one of the control grids of an amplifier tube 73. Similar relationships apply for the tubes 74—75 associated with the tank circuits 71—72. The other grids of the tubes 73—74—75 are connected to the output of the photocell amplifier 23, and separate amplitude-responsive meters 76—77—78 (in the cathode circuits of tubes 73—74—75) serve directly to read spectral intensity at the instant at which the associated tank circuit 70—71—72 is excited.

With the arrangement thus far described, each meter will indicate the intensity of light of a predetermined spectral "line" or region issuing from the diaphragm 13, whenever the crystal-excitation frequency is such that this predetermined spectral region or "line" coincides with the apertures in diaphragm 13. However, in accordance with the invention, operation of these filters 70—71—72 is precharacterized by variously presetting the gain of amplifiers 73—74—75, as suggested by adjustments (at 79—80—81) in the bias for the respective indicator circuits served by tank circuits 70—71—72. These varied bias settings, in effect, determine a preselected meter reading, as at 76 for the case of tank circuit 70, which the photoelectrically-derived output at 23 must attain for a given sweep of the spectrum by means 25'; to the extent that the meter reading at 76 fails to attain the preselected level, or to the extent that it exceeds such level, there is derived a polarized direct indication of deviation of the unknown spectrum (originating at 10) from the pre-characterized spectrum (represented by the initial gain settings at 79). The same argument applies with regard to deviation of observed meter readings at 77 and 78 for the cases of the respective spectral "lines" or regions served thereby, the reference levels for such "lines" having been preset at 80—81.

In a typical application of the device of FIG. 8 to the steel industry, the optical parts may be so oriented and aligned that the source 10 is a molten alloy, the component proportions of which are to be monitored; the source 10 may thus represent optical alignment through a furnace opening. If the alloy should require a carefully controlled proportioning of cobalt, manganese, and chromium, for example, the capacitors of the respective tank circuits need only to be adjusted once. Thus, the capacitor of circuit 35 should be preset, such that the resonant frequency of circuit 70 corresponds to the spectral position (on diaphragm 13) for which a particular strong resonance "line" of cobalt falls on the apertures of diaphragm 13. Similarly, circuit 71 can be adjusted for a characteristic "line" of manganese, and circuit 72 for a characteristic "line" of chromium. The various capacitor settings may be calibrated directly for the various elements of interest, such, for example as adjustment of circuit 70 to a preset point for cobalt, adjustment of circuit 71 to a preset point for manganese, and adjustment of circuit 72 to a preset point for chromium. The bias adjustments at 79, 80, 81 are then set to provide zero readings of meters 76, 77, 78 in case the percentage quantities of cobalt, manganese, and chromium respectively are the desired ones. Any deviations from these percentages (plus or minus) are then shown on the meters 76, 77, 78 which may be similarly calibrated to read directly in terms of percentage deviation from a standard for each of the special "lines" identifying the particular component element of interest. The meters 76, 77, 78 may be also replaced by servo controls by which the admixture percentages may be automatically adjusted to their desired proportions.

It will be seen that this invention provides a substantially improved spectrometer, in that the scanning of the spectrum can be effected automatically without mechanically moving parts, or at least with a minimum of mechanically moving parts, and that the scanning may be performed rapidly, and, if desired, in a rapidly recycling sequence. Scanning speed depends on such factors as the wavelength region to be investigated, the ultrasonic-cell length, and the spectral resolution required. For example, using an ultrasonic cell length of about 3 cm. with water as the ultrasonic medium, and 15 mc./s. as the center frequency for excitation of the crystal 14, a wavelength region corresponding to one micron (i.e. about double the visible spectrum, or from one to two microns in the infrared region, etc.) can be scanned within one twenty-fifth of a second with a resolution of 1,000 steps, each about 10 A wide. This periodicity (i.e. one twenty-fifth of a second) would be more than adequate to produce an apparently continuous and persistent display image on the screen of a cathode-ray tube.

In spite of the inherent simplicity of the described spectrometer, a number of obvious design expedients will improve the adaptability to special-purpose applications. Thus, the amplifier means 23 from the transducer 18 may be linear, logarithmic, or otherwise characterized, depending upon the type of output or display that is desired. These amplifier characteristics or the frequency-modulation function can be designed to compensate for or to "equalize" various irregularities, such as, absorption inherent in the optical components, including the liquid in the cell 15, as well as transducer-sensitivity variation with wavelength. This is particularly important in the infrared where many liquids and glasses have their own characteristic absorption spectra. Of course, depending upon the spectral region, particular liquids 15 and glasses 11—16—17—19 and cells 18 and optical filters can be selected for advantageous spectral transmission of the ultrasonic light modulator, which adds considerably to the flexibility of the device. In the case of the present invention, extreme simplicity of use and interpretation results, particularly for a number of samples to be reviewed (against a norm) on a production basis, in that deviations from the form are immediately observable and identifiable with the frequency at which the deviation occurs.

Quite aside from the speed of scan, a particular advantage of the described ultrasonic grating is its inherent freedom from "ghosts," which are a perpetually disturbing factor in ruled gratings.

While the invention has been described in detail for the preferred forms shown, it will be understood that modifications may be made within the scope of the invention as defined in the claims which follow.

What is claimed is:

1. A spectrometer, comprising an ultrasonic light-modulating cell, optics including said cell and including diaphragm means, means for subjecting said optics to a source of unknown light for spectral analysis, said diaphragm means being effective upon excitation of said cell at a particular frequency to pass a predermined color component of the spectrum formed by said cell, whereby particular color components are uniquely identified with particular excitation frequencies, an electric oscillating source connected in exciting relation with said cell, variable means for varying as a function of time the frequency of said oscillating source, whereby color components are passed by said optics in strict accordance with such frequency variation, transducer means electrically responsive to light passed by said optics, whereby solely through the action of said variable means there can be generated an electrical signal that in intensity as a function of time is unique to the unknown light, predetermined reference attenuating means for varying the amplitude of electrical signals developed by said transducer means, said reference attenuating means including a synchronizing connection to said frequency-varying means such that a cycle of frequency variation exactly corresponds with a cycle of said reference attenuating means, said reference means being characterized as a function of time in accordance with known spectral characteristics of reference light against which the unknown light is to be evaluated, and display means including means synchronized with the time functions of said frequency-varying means and of said reference means, whereby departures between the unknown and the known spectral qualities will be displayed.

2. A spectrometer according to claim 1, in which said means for subjecting said optics to light comprises a heat source, and a material of unknown spectral composition subjected to heat from said source, said reference means being characterized as a function of cell-excitation frequency in accordance with an expected spectral distribution for said unknown material, whereby said display means may indicate a departure of the material of unknown spectral composition from the characterized spectral distribution represented by said reference means.

3. A spectrometer according to claim 1, in which said means for subjecting said optics to light comprises an electric arc, and a material of unknown spectral distribution in the discharge region of said arc, said reference means being characterized as a function of cell-excitation frequency in accordance with a spectral distribution against which the spectral composition of the unknown material is to be observed.

4. A spectrometer according to claim 1, in which said reference means includes means coordinated with cell-excitation frequency for varying the amplitude of the excitation signal for said cell.

5. A spectrometer according to claim 1, in which said reference means includes means coordinated with cell-excitation frequency for variably attenuating light passed by said optics.

6. A spectrometer according to claim 1, in which said reference means includes means coordinated with cell-excitation frequency for variably biasing the electrical signal developed by said electrically responsive transducer means.

7. A spectrometer according to claim 1, in which said display means includes means responsive to the observed amplitude of the output of said electrically responsive means, and a plurality of filters responsive to separate particular cell-excitation frequencies within the range of frequencies corresponding to the optical spectrum to be observed, said filters being connected to said display, whereby the detected light amplitude for each filter frequency may be unambiguously identified therewith in the display, said reference means comprising for each said filter a separate selectively variable attenuating means, whereby the response of each filter may be preselected to conform with an expected spectrum response, whereby departures from said expected response in the observation of a particular unknown material may be immediately apparent at said display means.

8. A spectrometer according to claim 1, in which said reference means is a rotatable cylindrical band having a light transmission characteristic which varies on the axis of said optics as a function of rotary displacement of said band, the angular distribution of relative density of said band on the axis of said optics being so coordinated with the cell-excitation frequency as to represent an expected spectral distribution for a sample material to be analyzed by said spectrometer.

9. A spectrometer according to claim 1, in which said reference means is a disc rotatable about its axis and having an annular band of transparent material of varying density, the varying density being coordinated with cell-excitation frequency in accordance with an expected spectral distribution for a material to be analyzed by said spectrometer.

10. A spectrometer according to claim 1, in which said display means is a cathode-ray display device including a sweep circuit synchronized with frequency variation of said source, means for modulating said display device in accordance with the output of said transducer means, and characterized amplitude-modulating means coordinated with cell-excitation frequency and in amplitude-modulating relation with the excitation signal for said cell.

11. A spectrometer according to claim 1, and including marker means comprising an electric signal generator supplying a plurality of discrete known frequencies within the range of frequency variation of said source, said display means being connected to said generator and said generator being connected to said source, whereby said known frequencies may be displayed on the same frequency scale as said amplitude variation, and whereby the exact spectral location of any departure of an analyzed unknown spectrum from the synthesized spectrum represented by the characteristic of said reference means is immediately noticeable against the scale of marker pulses on said display.

References Cited in the file of this patent

UNITED STATES PATENTS

| | | |
|---|---|---|
| 2,240,722 | Snow | May 6, 1941 |
| 2,308,360 | Fair | Jan. 12, 1943 |
| 2,444,560 | Feldt et al. | July 6, 1948 |
| 2,513,520 | Rosenthal | July 4, 1950 |
| 2,597,001 | Jaffe | May 20, 1952 |
| 2,602,368 | Barnes | July 8, 1952 |
| 2,622,470 | Rines | Dec. 23, 1952 |
| 2,623,942 | Schlesinger | Dec. 30, 1952 |
| 2,650,307 | Koppius | Aug. 25, 1953 |
| 2,690,093 | Daly | Sept. 28, 1954 |
| 2,723,589 | Bullock et al. | Nov. 15, 1955 |

OTHER REFERENCES

Ultrasonics, Bergmann-Hatfield (1946), pages 63–65 relied on, John Wiley and Sons.

"Ultrasound Waves Made Visible," Willard, Bell Laboratories Record, vol. XXV, No. 5, May 1947, pages 194–200, pages 194–196 being relied on.

"Criteria for Normal and Abnormal Ultrasonic Sight Diffraction Effects," article by Willard, published in "The Journal of the Acoustical Society of America," vol. 21, No. 2, March 1949, pages 101–108.